US012361137B2

(12) United States Patent
Kasper et al.

(10) Patent No.: US 12,361,137 B2
(45) Date of Patent: Jul. 15, 2025

(54) CYBER SECURITY TESTING WITH AUTOMATED SYSTEM MESSAGE PROCESSING FOR INPUT AND RESULT DETERMINATION

(71) Applicant: INTERNATIONAL BUSINESS MACHINES CORPORATION, Armonk, NY (US)

(72) Inventors: Michael Page Kasper, Poughkeepsie, NY (US); Eric Rosenfeld, Pleasant Valley, NY (US); Bryan Childs, Poughkeepsie, NY (US); Diane Marie Stamboni, Poughkeepsie, NY (US); Joshua David Steen, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 18/193,018

(22) Filed: Mar. 30, 2023

(65) Prior Publication Data
US 2024/0330476 A1    Oct. 3, 2024

(51) Int. Cl.
*G06F 21/57*        (2013.01)
*G06F 11/3668*    (2025.01)

(52) U.S. Cl.
CPC ........ *G06F 21/577* (2013.01); *G06F 11/3688* (2013.01)

(58) Field of Classification Search
CPC .................. G06F 21/577; G06F 11/3688
See application file for complete search history.

(56) References Cited

U.S. PATENT DOCUMENTS

| 7,444,548 | B2 | 10/2008 | Shane |
| 8,332,952 | B2 | 12/2012 | Zhang et al. |
| 8,918,885 | B2 | 12/2014 | McClure et al. |
| 9,213,843 | B2 | 12/2015 | Naldurg et al. |
| 9,436,829 | B2 | 9/2016 | Tripp et al. |
| 10,319,457 | B2 | 6/2019 | Childs et al. |
| 10,803,166 | B1 | 10/2020 | Terkowitz et al. |

(Continued)

FOREIGN PATENT DOCUMENTS

| CN | 108804912 A | 11/2018 |
| CN | 110688659 A | 1/2020 |

(Continued)

OTHER PUBLICATIONS

Kasper et al., Detecting Security Vulnerabilities Through Dynamic Testing With Canary Programs, International Business Machines Corporation (IBM), U.S. Appl. No. 18/344,811, filed Jun. 29, 2023, 30 pages.

(Continued)

*Primary Examiner* — Carl G Colin
*Assistant Examiner* — Clayton Henry Hopkins
(74) *Attorney, Agent, or Firm* — Onyx IP Group

(57) ABSTRACT

Cyber security testing with automated system message processing for input and result determination is disclosed, including issuing, by a test tool, a call to an authorized service; identifying, by the test tool, one or more system-level error messages generated after issuing the call; determining, by the test tool based on at least one first system-level error message, a missing input for the call to the authorized service; and reissuing, by the test tool, the call to the authorized service with the missing input.

20 Claims, 4 Drawing Sheets

(56) References Cited

U.S. PATENT DOCUMENTS

| | | | |
|---|---|---|---|
| 10,872,157 | B2 | 12/2020 | Fong |
| 10,915,640 | B2 | 2/2021 | Kasper et al. |
| 10,977,379 | B1 | 4/2021 | Williams et al. |
| 11,010,479 | B2 | 5/2021 | Childs et al. |
| 11,030,063 | B1 * | 6/2021 | Shipilov .................. G06F 3/067 |
| 11,294,804 | B2 | 4/2022 | Hicks et al. |
| 11,500,763 | B1 | 11/2022 | Petrescu et al. |
| 2008/0104576 | A1 | 5/2008 | Kaksonen |
| 2011/0191854 | A1 | 8/2011 | Giakouminakis et al. |
| 2022/0253532 | A1 * | 8/2022 | Bishop, III ......... G06F 11/3688 |
| 2022/0391312 | A1 * | 12/2022 | Sharma ............... G06F 11/3688 |
| 2023/0376602 | A1 | 11/2023 | Kasper et al. |

FOREIGN PATENT DOCUMENTS

| | | |
|---|---|---|
| CN | 110442524 B | 3/2021 |
| CN | 113204496 A | 8/2021 |
| EP | 3709592 B1 | 7/2022 |

OTHER PUBLICATIONS

Mell et al., The NIST Definition of Cloud Computing, Recommendations of the National Institute of Standards and Technology, U.S. Department of Commerce, Special Publication 800-145, Sep. 2011, 7 pages.

Appendix P, List of IBM Patents or Patent Applications to be Treated as Related, Aug. 21, 2024, 2 pages.

* cited by examiner

_US 12,361,137 B2_

CYBER SECURITY TESTING WITH AUTOMATED SYSTEM MESSAGE PROCESSING FOR INPUT AND RESULT DETERMINATION

BACKGROUND

Field of the Disclosure

The field of the disclosure is security testing, or, more specifically, methods, apparatus, and products for cyber security testing with automated system message processing for input and result determination.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Authorized services, also known as kernel services or programs, can allow unauthorized programs to perform authorized functions. This typically requires the authorized program to verify input from an unauthorized program in order to maintain the integrity of the computer system. However, unauthorized programs can call authorized programs in unexpected ways, potentially causing an authorized program to bypass the integrity of the computer system and violate system confidentiality, integrity, or availability.

SUMMARY

Methods, apparatuses, and products for cyber security testing with automated system message processing for input and result determination according to various embodiments are disclosed. Cyber security testing with automated system message processing for input and result determination can include: issuing, by a test tool, a call to an authorized service; identifying, by the test tool, a system-level error message; determining, by the test tool based on the system-level error message, a missing input for the call to the authorized service; and reissuing, by the test tool, the call to the authorized service with the missing input.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
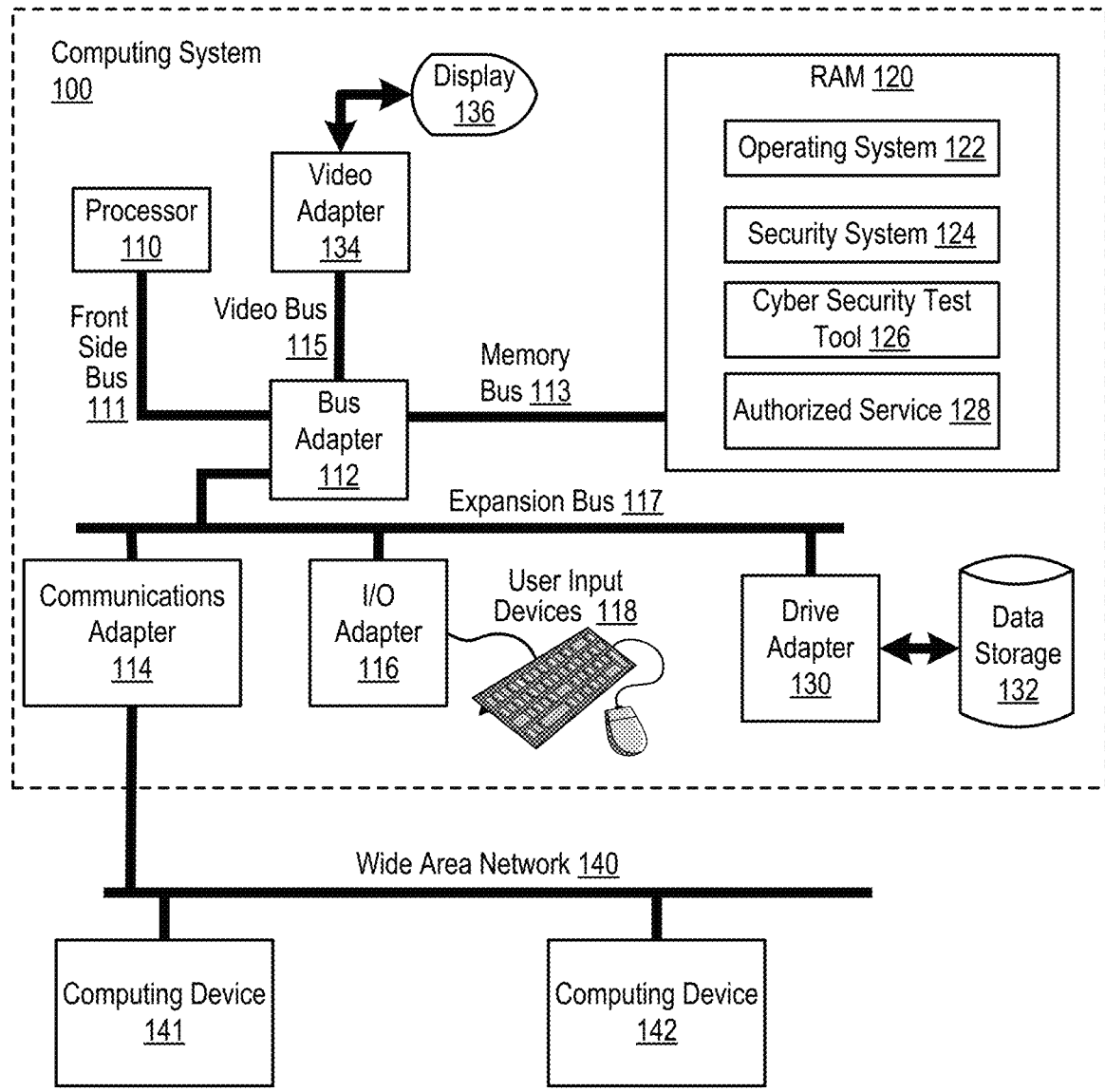
FIG. 1 a block diagram of an example computing system configured for cyber security testing with automated system message processing for input and result determination in accordance with embodiments of the present disclosure.

Authorized services, also known as kernel services or authorized programs, allow unauthorized programs to perform authorized functions. Authorized services are expected to verify input from an unauthorized program in order to maintain the integrity of a computer system. However, unauthorized programs can call authorized programs in unexpected ways. Malicious unauthorized programs may not rely on documented interfaces or intended uses of a service. Even a benign unauthorized program might unintentionally cause a denial-of-service or other type of security vulnerability based on a particular input.

It is beneficial that testing tools determine meaningful input data to supply to an authorized service. Random data may often return the same results every time without exercising many code paths in the authorized service, because random data does not consider required inputs for a service request. A service request may often be rejected for invalid input before reaching many sensitive areas of an authorized code path. When testing authorized programs for security vulnerabilities, one of the challenges is understanding the inputs that are required by the service in order to test and manipulate them as well as understanding the results of the test based on the impact that it has on the service and on the computer system as a whole.

In accordance with embodiments of the present disclosure, meaningful or required inputs to an authorized service are determined by analyzing the messages issued by the authorized service during dynamic testing of the service. For example, a system message might be issued indicating a missing file that was not provided and by processing that message and providing that file on the next attempt testing could continue and get further to find vulnerabilities. As another example, a series of messages might be issued that when combined can provide information about how to correctly call a service in order to provide more meaningful inputs, and get even further. As a result, the ability to automatically process and analyze a system message or series of system messages enables more effective tests.

In accordance with embodiments of the present disclosure, results from testing an authorized service are determined by analyzing the messages issued by the authorized service during dynamic testing of the service. One example of this would be when a dynamic test run against the service causes the service to crash, resulting in a denial of service. Specific individual messages or series of messages might indicate that the service has crashed during the time frame that the test was being executed, which might also be determined to be a repeatable result and could indicate that the test successfully crashed the service. Tracking such errors facilitates the building of test cases to test for security vulnerabilities. Another example would be if the service issues a message showing an authorized action was taken by a user or test that is known not be authorized. Thus, analyzing the message could allow the tester to reveal that system integrity was bypassed and use the time frame of the message or other properties of the message to determine the test related to the bypass.

In accordance with various embodiments of the present disclosure, a cyber security testing tool can analyze the content of the messages to identify system specific knowledge that can be applied during testing. The cyber security testing tool can also analyze sequences of messages for a more complex understanding of the system response. The cyber security testing tool can use data from messages to provide new input, thus allowing code paths to be tested that would not otherwise be tested. The cyber security testing tool can use data fields from within the messages to generate more detailed test responses rather than using the error type alone or simply using a program check or system dump for analysis. The cyber security testing tool can detect specific error conditions to allow the test program to identify when a security vulnerability has been found. The cyber security testing tool can also detect service availability errors and privilege escalation problems, thus allowing for the detection of new and otherwise overlooked security vulnerabilities.

Exemplary apparatus and systems for cyber security testing with automated system message processing for input and result determination in accordance with the present disclosure are described with reference to the accompanying drawings, beginning with FIG. 1. FIG. 1 sets forth a block diagram of automated computing machinery comprising an exemplary computing system 100 configured for cyber security testing with automated system message processing for input and result determination according to embodiments of the present disclosure. The computing system 100 of FIG. 1 includes at least one computer processor 110 or 'CPU' as well as random access memory ('RAM') 120 which is connected through a high speed memory bus 113 and bus adapter 112 to processor 110 and to other components of the computing system 100.

Stored in RAM 120 is an operating system 122. Operating systems useful in computers configured for cyber security testing with automated system message processing for input and result determination according to embodiments of the present disclosure include z/OS™, UNIX™. Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM is security system 124 that enforce access constraints to restricted resources such as restricted portions of memory.

Further stored in RAM is an authorized service 128, which may be a program configured with authorization to access restricted resources such as restricted portions of memory. Also stored in RAM is a cyber security test tool 126 configured for cyber security testing with automated system message processing for input and result determination according to embodiments of the present disclosure. The test tool 126 is a computer program configured to test for security vulnerabilities in authorized services using an analysis of system-level error messages. In some examples, the test tool is embodied in a set of computer program instructions that, when executed by the processor 110, cause the computing system 100 to carry out the automated steps of: issuing, by a test tool, a call to an authorized service; identifying, by the test tool, one or more system-level error messages generated after issuing the call; determining, by the test tool based on at least one system-level error message, a missing input for the call to the authorized service; and reissuing, by the test tool, the call to the authorized service with the missing input. The computer program instructions, when executed by the processor 110, may further cause the computing system to carry out the automated steps of: issuing, by the test tool, a call to the authorized service; identifying, by the test tool, one or more system-level error messages; and identifying, by the test tool based on the at least one system-level error message, a potential security vulnerability of the authorized service in relation to a test case.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1.

In some examples, RAM 120 may be subdivided into a plurality of address spaces, such as address space A, address space B . . . address space N, that each have different access permissions. For example, some programs may normally be limited to accessing the address space A, while the other programs may normally be limited to accessing the address space B. In some examples, one of the programs X of address space A may call one of the programs Y of address space B, where access constraints are expected to limit permissions of the program X of address space A in address space B. In some examples, RAM 120 also includes one or more system level components such as a security system 124. The security system 124 may provide controls that enforce access constraints to restricted portions of memory. For examples, the security system 124 may include an In some examples, the authorized service 128 may be a program configured to access portions of the RAM 120 that are not typically accessible by other programs such as the cyber security test tool 126. The cyber security test tool 126 can act as an unauthorized caller routine to issue a service request to the authorized service 128. Thus, the cyber security test tool 126 may be employed to test for security vulnerabilities related to access constraints and other security concerns. Further details regarding cyber security testing using an example cyber security test tool are described beginning with FIG. 2.

Figure 2:
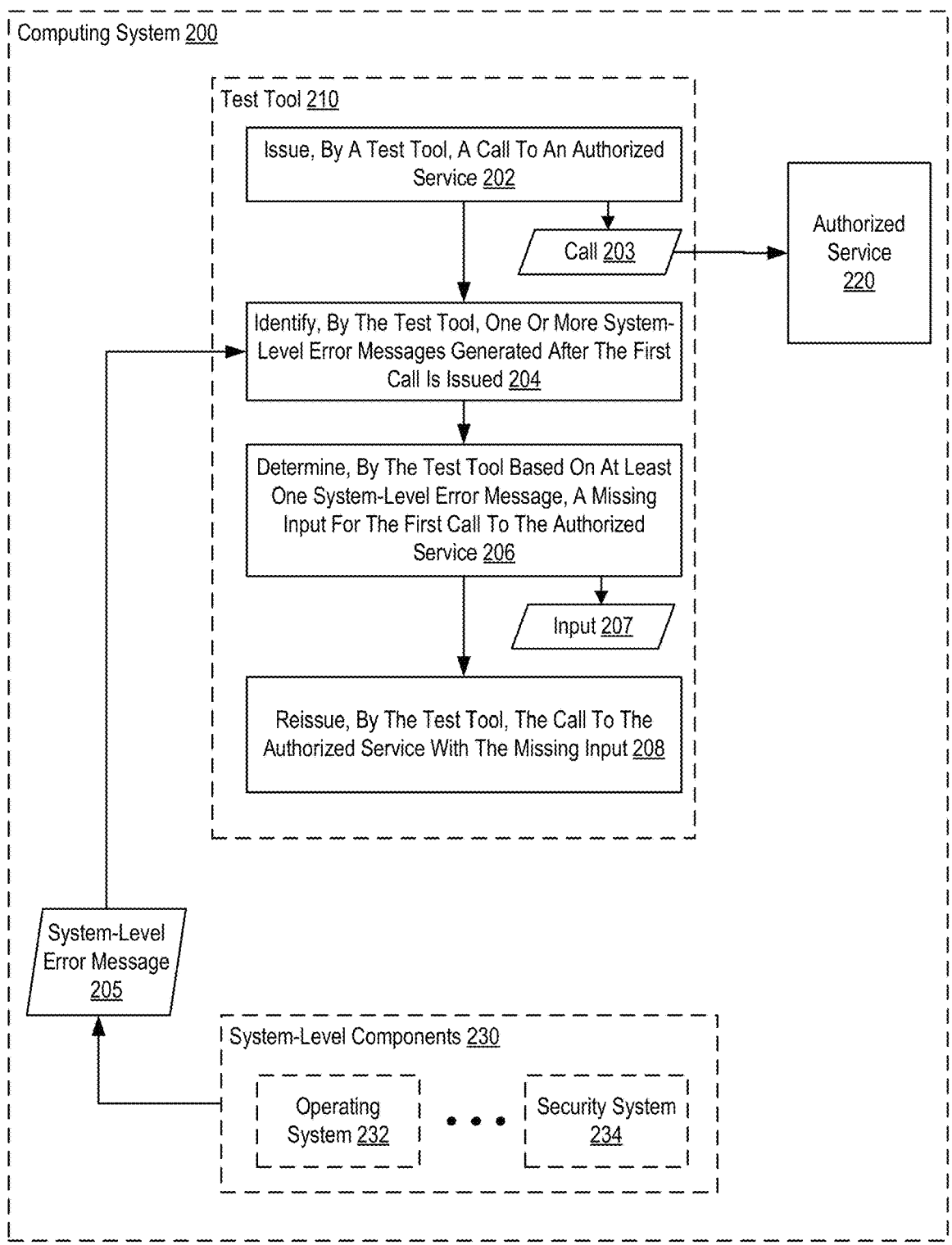
FIG. 2 is a flowchart of an example method for cyber security testing with automated system message processing for input and result determination according to some embodiments of the present disclosure.

For further explanation, FIG. 2 sets forth a flowchart illustrating an example method of cyber security testing with automated system message processing for input and result determination according to embodiments of the present disclosure. The example of FIG. 2 is described in the context of an example computing system 200 (e.g., the example computing system 100 of FIG. 1). The example computing system may be based on, for example, the z/Architecture offered by International Business Machines (IBM). However, the use of such an architecture is provided only as one example for the computer system 200 and is not intended to limit the scope of the present disclosure. The computer system 200 includes one or more system-level components 230 such as an operating system 232 and a security system 234. In some examples, the security system 234 includes an access control facility such as the resource access control facility (RACF) of the z/OS Operating System that protects resources by granting access only to authorized users of the protected resources, although it will be recognized other types of access control facilities perform similar functions. The security system 234 may also include control blocks such as the accessor environment element (ACEE) or the job step control block (JSCB) of the z/OS Operating System that protect resources by granting access only to authorized users of the protected resources, although it will be recognized other types of access control facilities performing similar functions. The operating system 232 (e.g., the operating system 122 of FIG. 1) may be any operating system that implements security provisions for running authorized services. In a particular example, the operating system 232 may be the z/OS operating system.

The method of FIG. 2 includes issuing 202, by a test tool 210, a call 203 to an authorized service 220. In some examples, the test tool 210 issues the call 203 to the authorized service by running a test case that invokes a particular function or interface of the authorized service. The authorized service 220 has access to restricted resources including restricted memory locations or functions that are inaccessible by the test tool 210. In one example, the authorized service may be a program authorized by an authorized program facility (APF). For example, the authorized service 220 may be a job-step program that is linked with an authorization code (e.g., AC(1) in z/OS) that gives authorized services 220 job-step authority when executed from authorized libraries. In some examples, when the operating system 232 starts a new job step, the first program specified (the job-step program) must have the appropriate job-step authorization code (e.g., AC(1)) and come from an authorized library for the step to run authorized. That program and subsequent programs in that step can execute programs from authorized libraries that do not have job-step authority. These programs, too, can run authorized. Thus, if authorized service 220 can be run or manipulated in unexpected ways, the unexpected behavior of the authorized service 220 may present a serious security vulnerability.

In some examples, the test tool 210 is adapted to test for cyber security vulnerabilities of authorized services. In some examples, the test tool 210 issues the call 203 to the authorized service 220 by calling a function of the authorized service 220 in order to analyze the result. For example, the test tool 210 may be a batch testing program that runs a series of test cases against the authorized service 220. Each test case may call one or more functions provided by the authorized service 220, for example, through an application programming interface (API). In calling these functions, the test case may provide one or more inputs. However, at initialization the test tool 210 may be unaware as to what inputs or parameters a particular call takes. If the call is successful (i.e., does not return an error), the test tool 210 can observe the results of the call and make additional calls based on those results to continue down a test path. If the authorized service does return an error, the test tool 210 might simply continue onto the next test. However, in accordance with embodiments of the present disclosure, the test tool 210 analyzes system-level error messages to refine the test case and/or test inputs.

The method of FIG. 2 also includes identifying 204, by the test tool 210, one or more system-level error messages 205 generated after the call 203 is issued. A system-level error message 205 provides more context and more detail than an error message generated by an application-level program. For example, error messages generated at the system level may include information such as register states, pointer information, reason codes, CPU information, and other information that may be accessible by the operating system or other system level component. In some examples, the test tool 210 identifies 204 a system-level error message 205 by intercepting an error message to a system operator or system console. For example, in response to identifying an error, the authorized service 220 may execute an exit routine in which an error message is generated to the system console.

In a particular example, a write-to-operator (WTO) message may be written to a message data block (MDB) of the operating system 232, thus the exit routine may be a WTO MDB exit. In some examples, such an error message is generated in response to a missing input provided with the call 203 to the authorized service 220. For example, for a particular call, the authorized service may expect a dataset definition (DD) specifying a source or destination dataset for the function. When that dataset definition is not included in the call 203 to the authorized service, the authorized service 220 may execute a WTO indicating that a dataset definition was expected and not included. The system-level error message 205 generated by the operating system in response to the WTO includes the text of the error message as well as other information such as a message identifier (ID). Typically, the system-level error message is provided to the system console, but in this case the message is also intercepted by the test tool 210.

The method of FIG. 2 also includes determining 206, by the test tool 210 based on at least a first system-level error message 205, a missing input 207 for the call 203 to the authorized service. In some examples, the test tool 210 determines 206 the missing input 207 by parsing the text of system-level error message 205. The test tool 210 can then determine from the system-level error message 205, what input or data field was expected by the authorized service 220. For example, the missing input 207 may be a function code, job card, dataset, file, and so on. In some examples, one or more missing inputs are determined based on a sequence of system-level error messages.

To aid illustration, consider an example where the system-level error message states 'Invalid Function Code 15 Please Specify A Function Code Between 96 and 127.' The test tool 210 may parse this text to determine that a function code between 96 and 127 should be specified. In reattempting the test case, the test tool 210 can use this information to configure the test case and other test cases to provide valid function codes to get further with the testing and find more security vulnerabilities.

In some examples, the test tool 210 determines 206 the missing input 207 by parsing the system-level error message 205 based on a message ID included in the error message. For example, the test tool 210 may access a table of message IDs using the message ID to identify a known structure of the error message, including particular data fields, and parse the error message based on that structure. The test tool 210 can then determine from the system-level error message 205, what input or data field was expected by the authorized service 220.

To aid illustration, consider an example where an authorized service is an AC(1) program that can be called as a job step program in a batch job, thus allowing it to run in an authorized state. When a batch job expects an input such as a dataset definition, but that input is not provided, the operating system 232 issues a system-level error message such as 'IEC130I Input DD Statement Missing.' By processing this message starting with the message ID of IEC130I, the test tool 210 can determine based on the message ID that the message has a particular structure for indicating a missing dataset definition, and thus it can be determined from parsing the message that the authorized service expected a dataset definition statement with the name of 'INPUT' to be provided to specify a dataset for the program. In reattempting the test, the test tool 210 can configure the test case or other test cases to provide a dataset definition statement with the name of 'INPUT' to allow the test to progress further in a test path to identify potential security vulnerabilities.

The method of FIG. 2 also includes reissuing 208, by the test tool 210, the call 203 to the authorized service 220 with the missing input 207. In some examples, the test tool 210 reissues 208 the call 203 to the authorized service 220 by first identifying a value that can be supplied as the missing input 207. The test tool 210 automatically determines the type of value to supply from the context of the system-level error message. Continuing the above examples, the value may be a function code, a job card identifier, the name of a file or dataset, and so on. The test tool 210 automatically makes the call to the authorized service again, providing the input that was missing from the first attempt. For example, the test tool 210 may rerun the test case with the missing input as part of an automated batch test loop. In some examples, other test cases that invoke the particular function of the authorized service are also modified to include the missing input. In this way, the progress of the test is advanced to potentially identify security vulnerabilities further along the code path. For example, it may happen that the missing input led to a buffer overflow or some other unexpected behavior, thus suggesting a potential security vulnerability.

In a particular example, the authorized service is a service that provides a time-sharing environment such as the time sharing option/extensions (TSO/E) service in z/OS. In these examples, the testing tool 210 is configured to test authorized TSO/E services as indicated in the AUTHCMD, AUTHPGM, and AUTHTSF parmlib members for z/OS. The tool can determine the list of available services on the system using standard TSO/E interfaces, test those services dynamically by providing input as required by the parameter list formats for those services, and then analyze system messages that occur as a result to determine more meaningful inputs and analyze error conditions that occur. This could detect the security vulnerabilities that might be exposed by testing of TSO/E authorized services.

Figure 3:
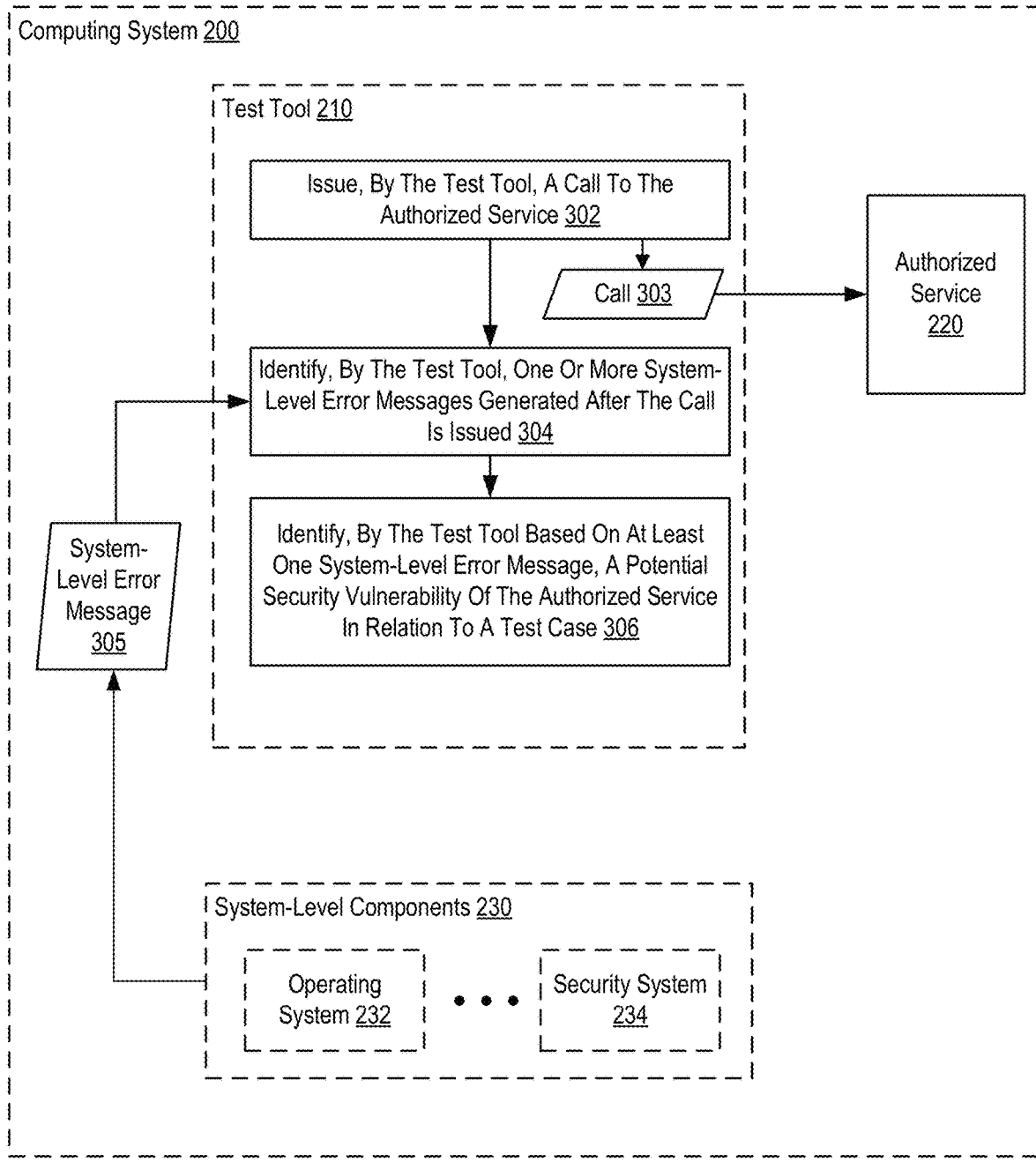
FIG. 3 is a flowchart of an example method for cyber security testing with automated system message processing for input and result determination according to some embodiments of the present disclosure.

For further explanation, FIG. 3 sets forth a flowchart illustrating an example method of cyber security testing with automated system message processing for input and result determination according to embodiments of the present disclosure. The method of FIG. 3 includes issuing 302, by the test tool 210, a call 303 to the authorized service 220. In some examples, the test tool 210 issues 302 the call 303 in the same manner described above with respect issuing 202 the call 203 of FIG. 2. In various examples, the second call to the authorized service 220 may be the reissued call discussed above or a completely different call to the authorized service 220.

The method of FIG. 3 also includes identifying 304, by the test tool 210, one or more system-level error messages 305 generated after the call 303 is issued. In some examples, the test tool 210 identifies a system-level error message 305 or sequence of system-level error messages by intercepting a WTO error message generated by the operating system as discussed above. In other examples, the test tool 210 identifies a system-level error message 305 by intercepting a message generated by the security system. The system-level error messages 305 are parsed, as discussed above, to identify the content of the message. For example, the one or more system-level error messages may be parsed based on a message ID that is used to identify a message structure.

In a particular example, the system-level error message 305 of FIG. 3 is different from the one or more system-level error messages 205 of FIG. 2 in that the one or more system-level error messages 305 of FIG. 3 relates to an abnormal end or 'crash' of the authorized service 220. For example, when a started task ends abnormally, the operating system 232 may generate a system-level error message that indicates that a system error has occurred. To aid illustration, consider an example where the system-level error message states 'IEA995I Symptom Dump Output.' The message may also indicate attributes of the system error such as a reason code, timestamp, CPU, program status at the time of error, and so on.

In some examples, the operating system 232 may also generate a sequence of related system-level error messages. The test tool 210 may combine the information from the sequence of system-level error messages for a more complex understanding of the result of the test case or function call. Continuing the above example, consider an example where another related system-level error message states 'IEF450I Server1 Program1-Abend=SOC4 Reason=000010 Time=13.40.09,' indicating that the started task Server1 abnormally ended at job step Program 1 with a particular reason code and a timestamp. In such examples, the test tool 210 may use the message IDs 'IEA995I' and 'IEF450I' to parse the error messages based on a message structure associated with those message IDs and extract their content based on known data fields. In such examples, the test tool 210 may combine the information from these system level error messages to determine that a test case that was running at time 13:40 resulted in the 'Server1' started task ending abnormally with a specific error that occurred with specific attributes.

In another example, the one or more system-level error message 305 of FIG. 3 is different from one or more system-level error message 205 of FIG. 2 in that the one or more system-level error messages 305 of FIG. 3 relates to an unauthorized action such as an authorization bypass, unexpected privilege escalation, password change, and so on. For example, the operating system 232 and/or security system 234 may generate a message in response to detecting that an authorization has been bypassed, detecting that resource was accessed by an unauthorized user, detecting that password as changed, and so on. To aid illustration, consider an example where the system-level error message 305 states 'Authorization Bypass Detected.' The system-level error message 305 may include a timestamp indicating when the bypass was detected, which can be correlated to a particular test case that was running at the time. Even where the system-level error message does not include known message ID, the content of the message can be parsed and recognized, e.g., through natural language processing.

The method of FIG. 3 also includes identifying 306, by the test tool based 210 on at least one system-level error message 305, a potential security vulnerability of the authorized service in relation to a test case. In some examples, the test tool 210 identifies the potential security vulnerability by determining, from the system-level error message or sequence of system-level error messages, that a test case has exposed a service availability flaw or privilege escalation vector that could be exploited to crash the authorized service or to gain unauthorized access to restricted resources. The test tool 210 identifies the potential security vulnerability in relation to the test case by correlating the system-level error message(s) to a particular test case. For example, the timestamp of the system-level error message can be correlated to the test case that was running at the time. The relationship between the test case and the error representing the potential security vulnerability is tracked, thus facilitating the construction of additional test cases that can further test the potential security vulnerability. For example, this tracking can aid the creation of a list of test cases that are known to crash the authorized service so that the problem can be diagnosed.

Figure 4:
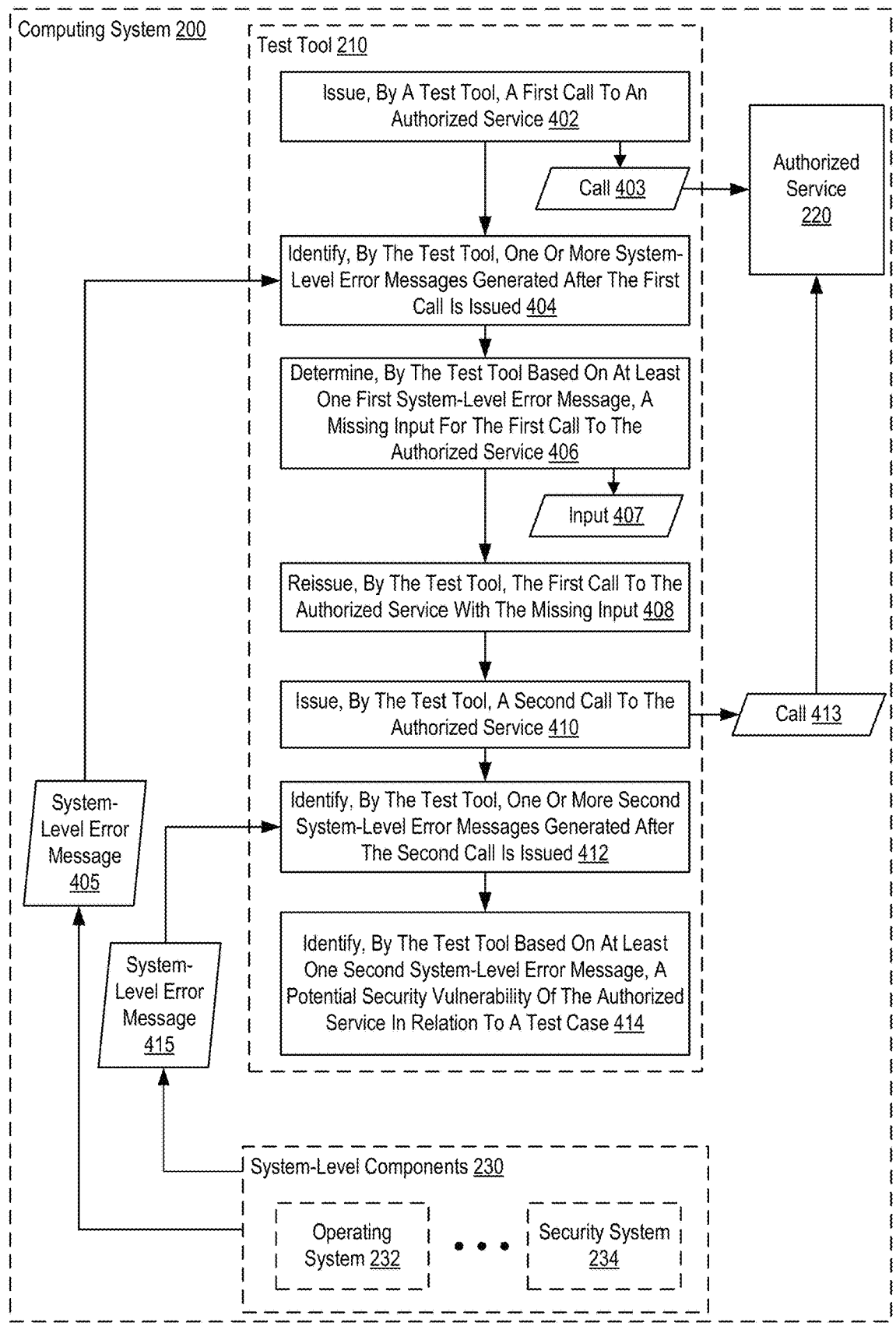
FIG. 4 is a flowchart of an example method for cyber security testing with automated system message processing for input and result determination according to some embodiments of the present disclosure.

For further explanation, FIG. 4 sets forth a flowchart illustrating an example method of cyber security testing with automated system message processing for input and result determination according to embodiments of the present disclosure. The method of FIG. 4 includes issuing 202, by a test tool 210, a first call 203 to an authorized service 220. In some examples, issuing 402 the first call 403 is carried out as described above with respect to issuing 202 the call 203 in FIG. 2.

The method of FIG. 4 also includes identifying 404, by the test tool 210, one or more system-level error messages 405 generated after first call 403 was issued. In some examples, identifying 404 one or more system-level error message 405 is carried out as described above with respect to identifying 204 one or more system-level error messages 205 in FIG. 2.

The method of FIG. 4 also includes determining 406, by the test tool 210 based on at least a first system-level error message 405, a missing input 407 for the first call 403 to the authorized service. In some examples, determining 406 the missing input 407 is carried out as described above with respect to determining 206 the missing input 207 in FIG. 2.

The method of FIG. 4 also includes reissuing 408, by the test tool 210, the first call 403 to the authorized service 220 with the missing input 407. In some examples, reissuing 408 the first call 403 is carried out as described above with respect to reissuing 208 the call 203 in FIG. 2.

The method of FIG. 4 also includes issuing 410, by the test tool 210, a second call 413 to the authorized service 220. In some examples, issuing 410 the second call 413 is carried out as described above with respect to issuing 302 a call 303 to the authorized service in FIG. 3.

The method of FIG. 4 also includes identifying 412, by the test tool 210, one or more second system-level error messages 415. In some examples, identifying 412 one or more second system-level error messages 415 is carried out as described above with respect to identifying 304 one or more system-level error messages 305 in FIG. 3.

Them method of FIG. 4 also includes identifying 414, by the test tool based 210 on at least one second system-level error message 415, a potential security vulnerability of the authorized service in relation to a test case. In some examples, identifying 414 a potential security vulnerability is carried out as discussed above with respect to identifying 306 a potential security vulnerability in FIG. 3.

In view of the explanations set forth above, readers will recognize a number of advantages of cyber security testing with automated system message processing for input and result determination according to embodiments of the present disclosure including:

Analyzing the content of the messages allows system specific knowledge to be applied.

Analyzing sequences of messages allows for more complex responses to be understood.

Using data from messages to send as new input allows code paths to be tested that would not otherwise be tested.

Using data fields from within the messages allows for more detailed responses to be crafted than the type or classification of message alone, or from a program check or system dump analysis.

Detecting specific error conditions allows for the test program to know when a security vulnerability has been found.

Detecting service availability errors and privilege escalation problems allows for the detection of new and otherwise overlooked security vulnerabilities.

Exemplary embodiments of the present disclosure are described largely in the context of a fully functional computer system for optimizing network load in multicast communications. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method of cyber security testing with automated system message processing for input and result determination, the method comprising:
   issuing, by a test tool, a first call to an authorized service;
   identifying, by the test tool, one or more system-level error messages generated after the first call is issued;
   determining, by the test tool based on at least a first system-level error message, a missing input for the first call to the authorized service; and
   reissuing, by the test tool, the first call to the authorized service with the missing input.

2. The method of claim 1, wherein the test tool is configured to test for cybersecurity vulnerability.

3. The method of claim 1, wherein the authorized service is configured to access restricted resources not accessible by the test tool.

4. The method of claim 1, wherein the test tool is initialized without awareness one or more required inputs for the first call.

5. The method of claim 1, wherein the first system-level error message is parsed based on a recognized message identifier to determine the missing input.

6. The method of claim 1, wherein the first system-level error message is generated by at least one of an operating system and a security system.

7. The method of claim 1 further comprising:
   issuing, by the test tool, a second call to the authorized service;
   identifying, by the test tool, one or more system-level error messages generated after the second call is issued; and
   identifying, by the test tool based on at least one second system-level error message, a potential security vulnerability of the authorized service in relation to a test case.

8. The method of claim 7, wherein the potential security vulnerability is identified based on a sequence of related system-level error messages.

9. The method of claim 7, wherein the potential security vulnerability includes at least one of service availability and privilege escalation.

10. The method of claim 7, wherein the second system-level error message is parsed based on a recognized message identifier, and wherein a timestamp parsed from the second system-level error message is correlated to the test case.

11. An apparatus for cyber security testing with automated system message processing for input and result determination, the apparatus comprising a computer processor, a computer memory operatively coupled to the computer processor, the computer memory having disposed therein computer program instructions that, when executed by the computer processor, cause the apparatus to carry out the steps of:
   issuing, by a test tool, a first call to an authorized service;
   identifying, by the test tool, one or more system-level error messages generated after the first call is issued;
   determining, by the test tool based on at least a first system-level error message, a missing input for the first call to the authorized service; and
   reissuing, by the test tool, the first call to the authorized service with the missing input.

12. The apparatus of claim 11, wherein the authorized service is configured to access restricted resources not accessible by the test tool.

13. The apparatus of claim 11, wherein the test tool is initialized without awareness one or more required inputs for the first call.

14. The apparatus of claim 11, wherein the first system-level error message is parsed based on a recognized message identifier to determine the missing input.

15. The apparatus of claim 11, further comprising computer program instructions that, when executed by the computer processor, cause the apparatus to carry out the steps of:
   issuing, by the test tool, a second call to the authorized service;
   identifying, by the test tool, one or more system-level error messages generated after the second call is issued; and
   identifying, by the test tool based on at least one second system-level error message, a potential security vulnerability of the authorized service in relation to a test case.

16. A computer program product for cyber security testing with automated system message processing for input and result determination, the computer program product comprising a computer readable storage medium having stored thereon computer program instructions that, when executed, cause a computer to carry out the steps of:
   issuing, by a test tool, a first call to an authorized service;
   identifying, by the test tool, one or more system-level error messages generated after the first call is issued;
   determining, by the test tool based on at least a first system-level error message, a missing input for the first call to the authorized service; and
   reissuing, by the test tool, the first call to the authorized service with the missing input.

17. The computer program product of claim 16, wherein the computer program product further comprises computer program instructions that, when executed, cause the computer to carry out the steps of:
   issuing, by the test tool, a second call to the authorized service;
   identifying, by the test tool, one or more system-level error messages generated after the second call is issued; and
   identifying, by the test tool based on at least one second system-level error message, a potential security vulnerability of the authorized service in relation to a test case.

18. The computer program product of claim 17, wherein the potential security vulnerability is identified based on a sequence of related system-level error messages.

19. The computer program product of claim 17, wherein the potential security vulnerability includes at least one of service availability and privilege escalation.

20. The computer program product of claim 17, wherein the second system-level error message is parsed based on a recognized message identifier, and wherein a timestamp parsed from the second system-level error message is correlated to the test case.

* * * * *